US 6,237,477 B1

(12) United States Patent
Huddle

(10) Patent No.: US 6,237,477 B1
(45) Date of Patent: May 29, 2001

(54) APPARATUS AND METHOD FOR PROCESSING ROOT VEGETABLES

(76) Inventor: Jay Huddle, M625 Rd. 11, Napolean, OH (US) 43545

( * ) Notice: Subject to any disclaimer, the term of this patent is extended or adjusted under 35 U.S.C. 154(b) by 0 days.

(21) Appl. No.: 09/271,676

(22) Filed: Mar. 18, 1999

(51) Int. Cl.$^7$ .................................................. A23N 15/08
(52) U.S. Cl. ................................ 99/636; 99/546; 99/642; 99/643; 99/637
(58) Field of Search ............................ 99/546, 636, 643, 99/642, 635, 637

(56) References Cited

U.S. PATENT DOCUMENTS

| 2,096,588 | * | 12/1937 | King | 99/643 |
| 2,628,621 | * | 2/1953 | Murdoch | 99/636 |
| 3,734,004 | * | 5/1973 | Losito . | |
| 4,094,238 | * | 6/1978 | Striplin | 99/633 |
| 4,198,903 | * | 4/1980 | Turatti | 99/643 |
| 4,202,201 | * | 5/1980 | Lawson | 99/636 |
| 4,455,729 | * | 6/1984 | Goudarzi et al. | 99/643 |
| 4,777,055 | | 10/1988 | Laiw . | |
| 5,495,797 | * | 3/1996 | Meulnart | 99/643 |
| 5,750,171 | * | 5/1998 | Shuknecht | 99/566 |

* cited by examiner

*Primary Examiner*—Gabrielle Brouillette
*Assistant Examiner*—Hao Mai
(74) *Attorney, Agent, or Firm*—MacMillan, Sobanski & Todd, LLC

(57) ABSTRACT

An apparatus and method for processing a root vegetable, such as a radish. The apparatus includes a hopper, a track, and a cutting mechanism. The hopper includes a reciprocating chute for providing a radish from a plurality of radishes to the track. As the radish travels down the track, the radish is properly positioned and orientated such that a tip portion of the radish is disposed between spiral threads in the track. If the radish is not properly oriented, air pressure is applied against the radish to remove the radish from the track. If the radish is properly oriented, it reaches the cutting mechanism having a pair of belts that frictionally engage the radish. As the radish travels through the cutting mechanism, the radish encounters a first blade which cuts a bottom portion from the radish. As the radish continues to travel through the cutting mechanism, another pair of belts frictionally engage the top portion of the radish and properly positions the radish for a second blade to cut a top portion from the radish. The processed radish is then expelled from the cutting mechanism onto a conveyor belt for packaging and delivery to the consumer. The method includes the steps of providing a root vegetable, orientating the root vegetable and cutting the top and bottom portion from the root vegetable.

19 Claims, 6 Drawing Sheets

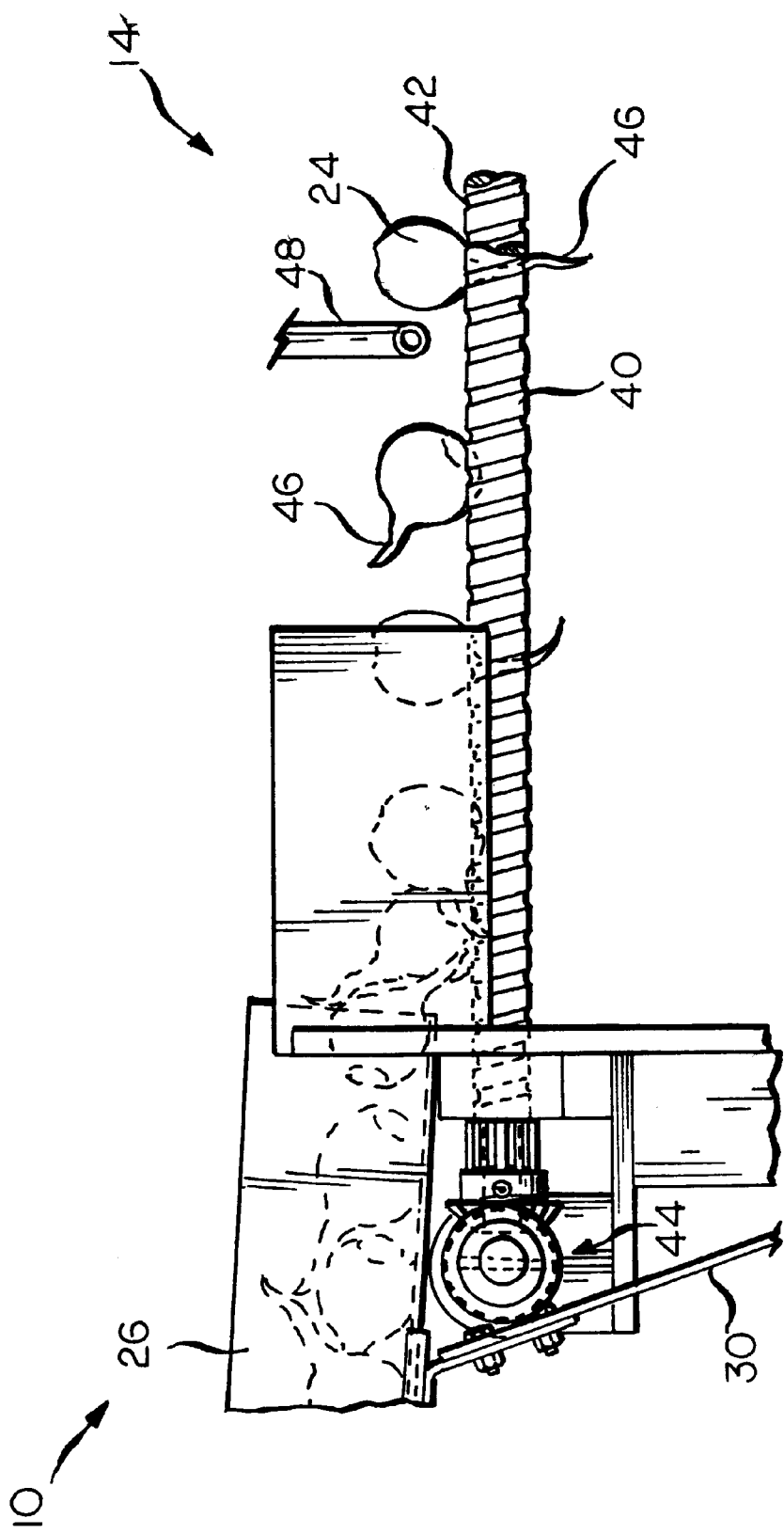

APPARATUS AND METHOD FOR PROCESSING ROOT VEGETABLES

BACKGROUND OF THE INVENTION

This invention relates in general to an apparatus and method for processing a root vegetable, and in particular to an apparatus and method for processing a radish by automatically removing the top and bottom portion from the radish.

A vegetable is the edible product of a plant with a soft stem. Vegetables can be grouped according to the edible part of each plant: leaves, stalks, roots, tubers, bulbs, and flowers. In addition, fruits, such as the tomato, and seeds, such as peas, are commonly considered vegetables.

Vegetables grown for their edible roots or tubers encompass a wide range of starchy root crops, some of which are true botanical roots and others which are tubers or corms. Some common root vegetables include beets, carrots, celery root, ginger, horseradish, jicana, parsnip, radishes, rutubaga, salsify and turnip. The most economically significant root crops globally include potato, sweetpotato (also spelled sweet potato), cassava, yams, and aroids. Although traditionally, root vegetables have been considered low status and generally unimportant crops by consumers, governmental organizations, and researchers, on a global scale they account for three of the seven most important food crops in the world.

Of these five majors root crops, only potato and sweetpotato are grown to any extent in the United States, and of these two, sweetpotato has the greatest potential for increased usage and consumption. However, there are other starchy root vegetables grown in various areas of the world where they are of local economic and cultural importance and which could conceivably be considered potential new crops for domestic consumption. Among the most promising may be some of the Andean root crops. In addition, apios has received attention as a potential new crop. Apios is unique among the root and tuber crops mentioned in that it fixes nitrogen and also produces edible tubers, fleshy roots, and seeds. Tubers are high in protein and carbohydrates and are preferred by some to the domestic potato.

However, radishes (*Raphanus sativus* L. (Brassicaceae)), the common name for any member of a genus of herbs of the mustard family, are increasing in popularity because they can be eaten raw as a snack, sliced for salads or boiled and sliced. Radishes are a cruciferous vegetable related to broccoli and cabbage and are high in vitamin C (38 percent of the Recommended Daily Allowance) and low in calories (17 per cup sliced). The Japanese radish, called the daikon, may be pickled or eaten raw.

Radishes are believed to be native to China and are a cool-season crop that do not do well in the hot summer months. They are grown for the root which usually is eaten raw, alone or in salads. Radishes, which can grow in partial shade, require very little room and mature quickly. They are well suited to small gardens, flower beds and containers.

There are many different varieties of radishes: the red varieties with small roots, round or oblong with a white tip and include the Cherry Belle and Early Scarlet Globe, and the white varieties with longer roots like the carrot and include the Icicle and the Round White. The Cherry Belle is the most popular and has small, round, bright red roots with short tops and is ideal for garnishes or use in salads.

The harvest time of radishes varies with the variety. The roots should be harvested when a moderate size. Splitting and pithiness occurs if the roots are allowed to become overmature. When harvested, the leaves at the top are usually cut and the radish can be stored for several weeks.

When packaged for shipment to stores or distributors, the top and bottom with the stem of the radish are usually cut by hand. This manual method results in a very time-consuming and tedious operation because of the enormous amount of radishes that are to be processed. Thus, it would be highly desirable to proved an apparatus and method for processing root vegetables, for example, radishes and the like, automatically without the need for manually cutting the top and bottom, thereby increasing productivity.

SUMMARY OF THE INVENTION

This invention relates to an apparatus and method for preparing a root vegetable, such as a radish. The apparatus comprises a feeding mechanism for providing a root vegetable, a transporting mechanism operatively connected to the feeding mechanism for orientating the root vegetable, and a cutting mechanism operatively connected to the transporting mechanism for cutting one of a top section and a bottom section from the root vegetable. The feeding mechanism includes a hopper for holding a plurality of root vegetables. The hopper is connected to a chute that reciprocates for providing a stream of spaced apart root vegetables to the transporting mechanism. The transporting mechanism comprises a pair of spaced apart threaded rods. The rods rotate in opposite directions. Because the tail of the root vegetable is heavier than the rest of the root vegetable, the tail of the root vegetable becomes trapped between grooves in the rotating rods. When this occurs, the root vegetable becomes properly oriented with its tail down as it travels down the rods to the cutting mechanism. If not properly oriented, the root vegetable is removed from the transporting mechanism by the application of pressurized air. The cutting mechanism includes a first pair of rotating belts for frictionally engaging the root vegetable once it reaches the cutting mechanism. As the root vegetable travels through the cutting mechanism, a first blade cuts the bottom portion from the root vegetable. As the root vegetable continues to travel through the cutting mechanism, a second pair of belts frictionally engage the top portion of the root vegetable to properly position the root vegetable as it encounters a second blade to remove the top portion from the root vegetable. The processed root vegetable with the top and bottom portions removed is then ejected from the cutting mechanism, preferably onto a conveyor belt for packaging and shipping to the consumer. A method of processing the root vegetable is also disclosed.

Various objects and advantages of this invention will become apparent to those skilled in the art from the following detailed description of the preferred embodiment, when read in light of the accompanying drawings.

BRIEF DESCRIPTION OF THE DRAWINGS

FIGS. 1A–1C are side elevational views of the feeding mechanism, transporting mechanism and cutting mechanism, respectively, according to a preferred embodiment of the invention;

DETAILED DESCRIPTION OF THE PREFERRED EMBODIMENT

Figure 1A:
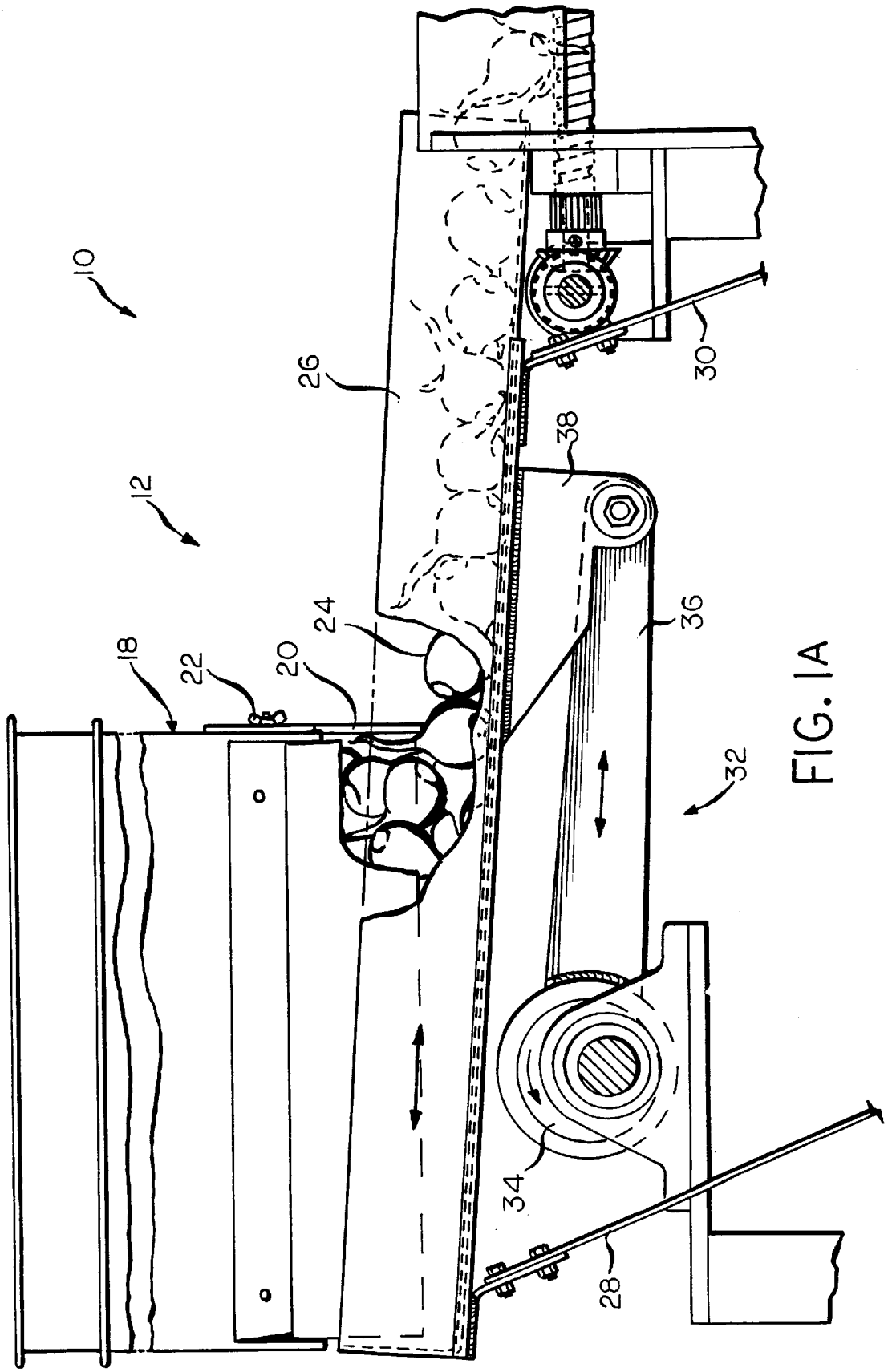
Figure 3:
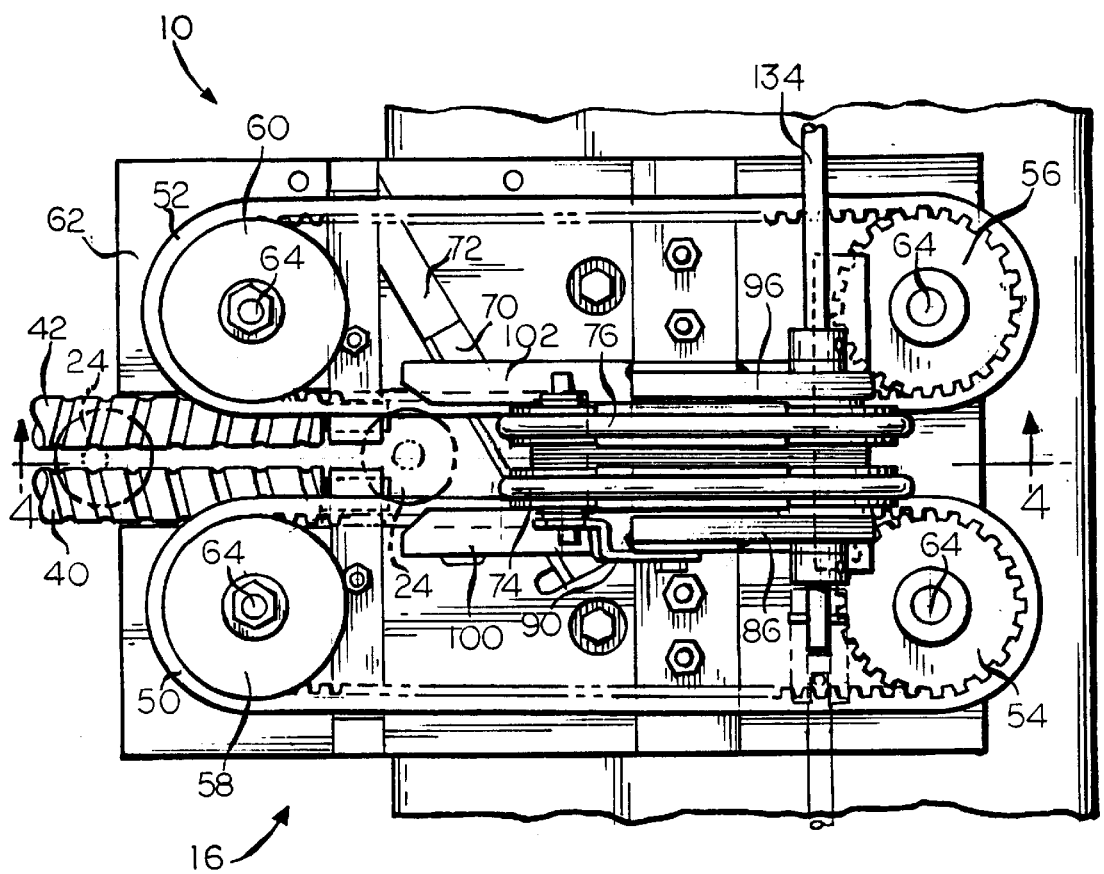
FIG. 3 is a top plan view of the cutting mechanism of FIG. 2.
Figure 1C:
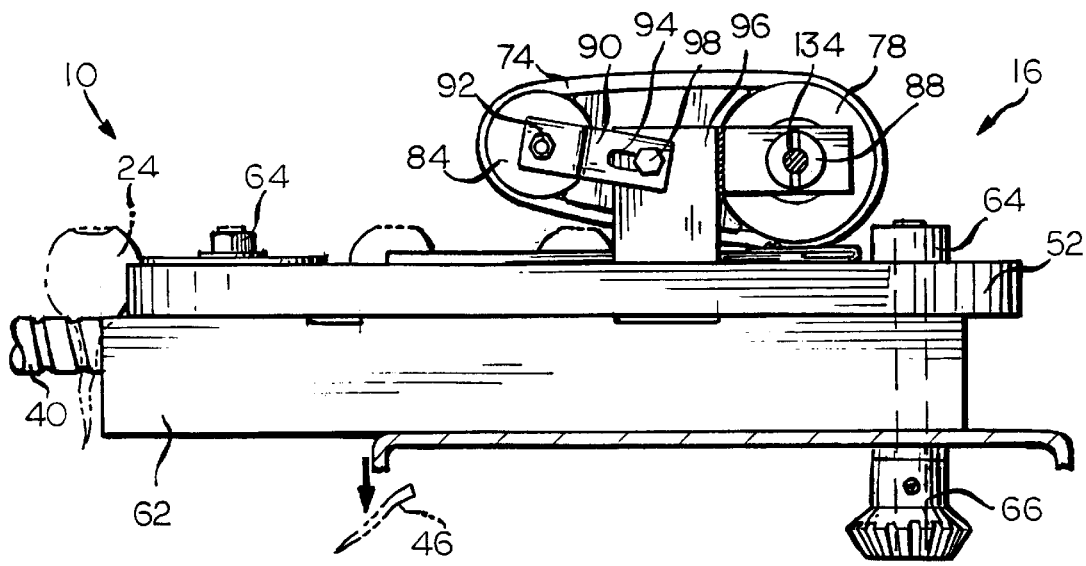

Referring now to the drawings, there is illustrated in FIGS. 1A–1C, an apparatus, shown generally at 10, for processing a root vegetable, such as a radish, according to a preferred embodiment of the invention. In general, the apparatus 10 comprises a feeding mechanism, shown generally at 12 in FIG. 1A, a transporting mechanism, shown generally at 14 in FIG. 1B, and a cutting mechanism, shown generally at 16 in FIG. 1C.

Referring now to FIG. 1A, the feeding mechanism 12 includes a hopper 18 for containing a plurality of radishes. The hopper 18 may be sized to any desirable dimension and can be made of any durable, washable material, such as stainless steel, plastic, and the like. The hopper 18 may include a shield plate 20 for covering an opening in one of the side walls of the hopper 18. The shield plate 20 is preferably slidably and removably attached to the side wall of the hopper 18 by using means well known in the art, such as a wing nut 22. In this manner, the shield plate 20 can be positioned at a desired location in order to regulate the number of radishes passing through the opening in the side wall of the hopper 18. Preferably, the shield plate 20 is positioned to allow only one radish 24 at a time to pass through the opening of the side wall of the hopper 18.

The feeding mechanism 12 is provided with a chute 26 attached to the hopper 18 for receiving the radishes that pass through the opening in the side wall of the hopper 18. The chute 26 may be constructed of any durable, washable material, such as stainless steel, plastic, and the like. The chute 26 may be attached to the hopper 18 using means well known in the art, such as threaded fasteners. Alternatively, the chute 26 may be integrally formed with the hopper 18. The chute 26 is preferably at an angle of a few degrees with respect to the horizontal axis, as shown in FIG. 1A, so that the radishes are fed by gravity to the transporting mechanism 14. To accomplish this, the chute 26 may be supported by a pair of braces 28, 30.

The feeding mechanism 12 also includes means 32 for reciprocating the hopper 18 to facilitate the feeding of the radishes through the opening in the side wall of the hopper 18. In the preferred embodiment, the reciprocating means 32 comprises an offset cam mechanism 34, a rod 36 connected to the cam mechanism 34, and a flange 38 extending downward from the chute 26 and connected to the rod 36. As indicated by the arrows in FIG. 1A, the rotation of the cam mechanism 34 causes the rod 36 to move back and forth in a reciprocating fashion, which in turn, causes the chute 26 also to move back and forth in a reciprocating fashion. The reciprocating movement of the chute 26 facilitates the feeding of the radishes through the opening in the side wall of the hopper 18. The cam mechanism 34 is rotated by means of a drive mechanism 112 (FIG. 5) as discussed below.

Referring now to FIG. 1B, the transporting mechanism 14 of the apparatus 10 is provided with a pair of threaded rods 40, 42 in a substantially parallel relationship with each other. The threaded rods 40, 42 are connected at one end to a worm gear mechanism 44 for rotating the threaded rods 40, 42. The other ends of the threaded rods 40, 42 are rotatably connected to the cutting mechanism 16 (FIG. 1C). Preferably, the threaded rods 40, 42 are rotated in opposite directions with respect to each other. In other words, one rod 40 is rotated in a clockwise direction and the other rod 42 is rotated in a counter-clockwise direction. As the radish 24 leaves the chute 26 of the feeding mechanism 12 and travels onto the threaded rods 40, 42 of the transporting mechanism 14, the tail 46 of the radish 24 will tend to point downward because the tail 46 of the radish 24 is heavier than the body of the radish 24. As the tail 46 points downward, the tail 46 will preferably become trapped between the threads of the threaded rods 40, 42 and is pulled further downward between the threaded rods 40, 42. As a result, the radish 24 become properly oriented on the transporting mechanism 14 with its tail 46 pointing downward. The speed of rotation of the threaded rods 40, 42 is such that the radish 24 travels with a desired linear velocity down the transporting mechanism 14. This linear velocity will be further discussed below.

The transporting mechanism 14 further includes a pneumatic device 48, such as an air hose, connected to a pressurized air supply (not shown). Preferably, the air hose 48 is positioned adjacent the radish 24 as it travels down the transporting mechanism 14. If the radish 24 is not properly oriented, that is, the tail 46 of the radish 24 is not trapped between the threaded rods 40, 42, then the force of the pressurized air from the air hose 48 exerted on the radish 24 will cause the radish 24 to be blown off and removed from the transporting mechanism 14 (as indicated by the arrow in FIG. 2).

Referring now to FIGS. 1C, 2, 3 and 4, the cutting mechanism 16 of the apparatus 10 includes a pair of spaced-apart, rotating belts 50, 52. Preferably, the belts 50, 52 rotate in opposite directions, that is, the belt 50 may rotate in a clockwise direction, and the belt 52 may rotate in a counter-clockwise direction. The belts 50, 52 are preferably spaced-apart a suitable distance to allow the radish 24 to frictionally engage each belt 50, 52 as the radish 24 passes from the transporting mechanism 14 to the cutting mechanism 16. The belts 50, 52 are preferably made of a durable, sponge-like, flexible rubber material for frictionally engaging the radish 24 without damaging the radish 24. The surface of the belts 50, 52 engaging the radish 24 may have a nylon coating to increase the durability of the belts 50, 52. Each belt 50, 52 is driven by a drive spool 54, 56, respectively. The inside surface of each belt 50, 52 may include treads that are complementary to the treads on each drive spool 54, 56 such that the belts 50, 52 positively engage each drive spool 54, 56. The tension of each belt 50, 52 can be adjusted by a spool 58, 60 located at the other end of each belt 50, 52. The drive spools 54, 56 and associated spools 58, 60 are rotatably mounted on a base 62 using means well known in the art, such as threaded fasteners 64. The base 62 preferably is made of washable, durable material, such as stainless steel, plastic, and the like. The drive spools 54, 56 are driven by a worm gears 66, 68 (only one illustrated in FIG. 1C) mounted to the opposite side of the base 62. The worm gears 66, 68 are drivingly connected to the drive mechanism 112 (FIG. 5) as discussed below.

The speed of the rotating belts 50, 52 is such that the radish 24 travels at a desired linear velocity through the cutting mechanism 16. Preferably, the linear velocity of the radish 24 through the cutting mechanism 16 is approximately equal to the linear velocity of the radish 24 through the transporting mechanism 14. In this manner, the radishes leaving the feeding mechanism 12 and traveling through the transporting mechanism 14 and into the cutting mechanism 16 proceed in an orderly fashion.

Figure 4:
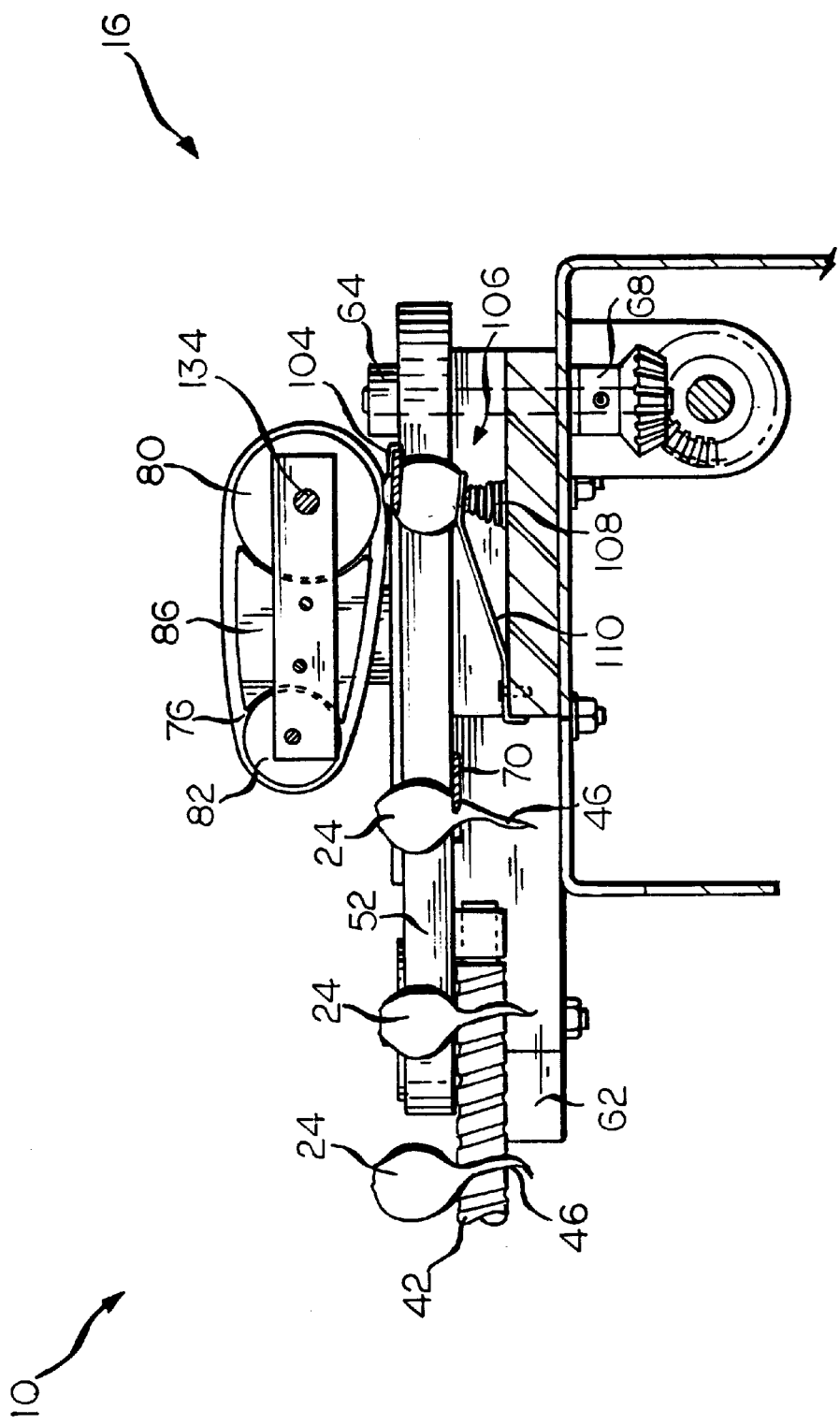
FIG. 4 is a side cross-sectional view of the cutting mechanism taken along line 4—4 of FIG. 3.

As the radish 24 travels through the cutting mechanism 16, the radish 24 engages a first cutting blade 70. The cutting blade 70 may be mounted to the base 62 at an angle with respect to the direction of travel of the radish 24. For easily removing the cutting blade 70 for servicing or replacement, the cutting blade 70 is preferably disposed within a slot 72 formed in the base 62. As best seen in FIG. 4, the first cutting blade 70 is mounted at an axial elevation with respect the radish 24 so as to cut off a bottom portion or tail 46 of the radish 24 as it travels through the cutting mechanism 16. The tail 46 of the radish 24 then drops off in the direction of the arrow as indicated in FIG. 1C. At this point, the bottom portion or tail 46 of the radish 24 has been properly removed by the cutting mechanism 16.

As the radish continues to travel through the cutting mechanism 16, a second pair of rotating belts 74, 76 engage a top portion of the radish 24, as best seen in FIG. 1C. Unlike the belts 50, 52, the belts 74, 76 rotate in the same direction. Similar to the belts 50, 52, the belts 74, 76 are preferably spaced-apart a suitable distance to allow the radish 24 to frictionally engage each belt 74, 76 as the radish 24 passes through the cutting mechanism 16. The belts 74, 76 are preferably made of a durable, rubber material for frictionally engaging the radish 24 without damaging the radish 24. Each belt 74, 76 is driven by a drive spool 78, 80, respectively. The tension of each belt 74, 76 can be adjusted by a spool 82, 84 located at the other end of each belt 74, 76. The drive spools 78, 80 may be rotatably mounted on a bracket 86 using means well known in the art, such as a threaded fastener 88.

As best seen in FIG. 1C, the angle at which the belts 74, 76 frictionally engage the radish 24 may be adjusted by means of a bracket 90 attached to one of the spools 82, 84 using means well known in the art, such as a threaded fastener 92. The bracket 90 includes a slot 94 for slidably mounting the bracket 90 to a bracket 96 mounted to the base 62 using a threaded fastener 98. The slot 94 in the bracket 90, in combination with the threaded fastener 98 allows the angle of the belts 74, 76 to be adjusted with respect to the radish 24. This can be accomplished by loosening the threaded fastener 98, positioning the belts 74, 76 at the desired angle, and then tightening the threaded fastener 98 to lock the belts 74, 76 at the desired angle.

The cutting mechanism may also include a pair of side walls 100, 102. The side walls 100, 102 provide lateral support for the radish 24 and the belts 50, 52 as the radish 24 travels through the cutting mechanism 16. It should be noted that the side walls 100, 102 can be supported by springs (not shown) to enable root vegetables of various sizes to be processed. In this manner, the radish 24 will be held firmly in place as it engages the belts 74, 76 while simultaneously engaging the belts 50, 52. Because the radish 24 simultaneously engages the belts 50, 52 and the belts 74, 76, it is important that the rotational speed of the belts 74, 76 is such that the linear velocity of the radish 24 does not change as it engages the belts 74, 76 so as to not disrupt the orientation of the radish 24.

As best seen in FIG. 4, the radish 24 engages a second cutting blade 104 as it continues to travel through the cutting mechanism 16. A spring mechanism, shown generally at 106, engages the bottom portion of the radish 24 while the belts 74, 76 frictionally engage the top portion of the radish 24. The spring mechanism 106 preferably includes a spring 108 that provide an upward bias to a plate 110. The plate 110 has an angle with respect to the radish 24 that is approximately equal to the angle of the belts 74, 76 so that the orientation of the radish 24 does not change as the radish 24 simultaneously engages the belts 74, 76 and the plate 110. As the radish 24 engages both the belts 74, 76 and the plate 110, the radish 24 is depressed in the downward direction (as viewed from FIG. 4) so as to properly position the top portion of the radish 24 prior to engaging the second cutting blade 104. It should be noted that the amount of spring bias can be adjusted in order to vary the amount of the top portion of the radish 24 is removed by the second cutting blade 104. In the preferred embodiment, only approximately 10 to 15% of the radish is removed, as compared to approximately 50% in conventional preparation devices. Thus, the apparatus 10 of the invention greatly reduces the amount of waste from preparing the root vegetable as compared to conventional root vegetable preparation devices.

Figure 2:
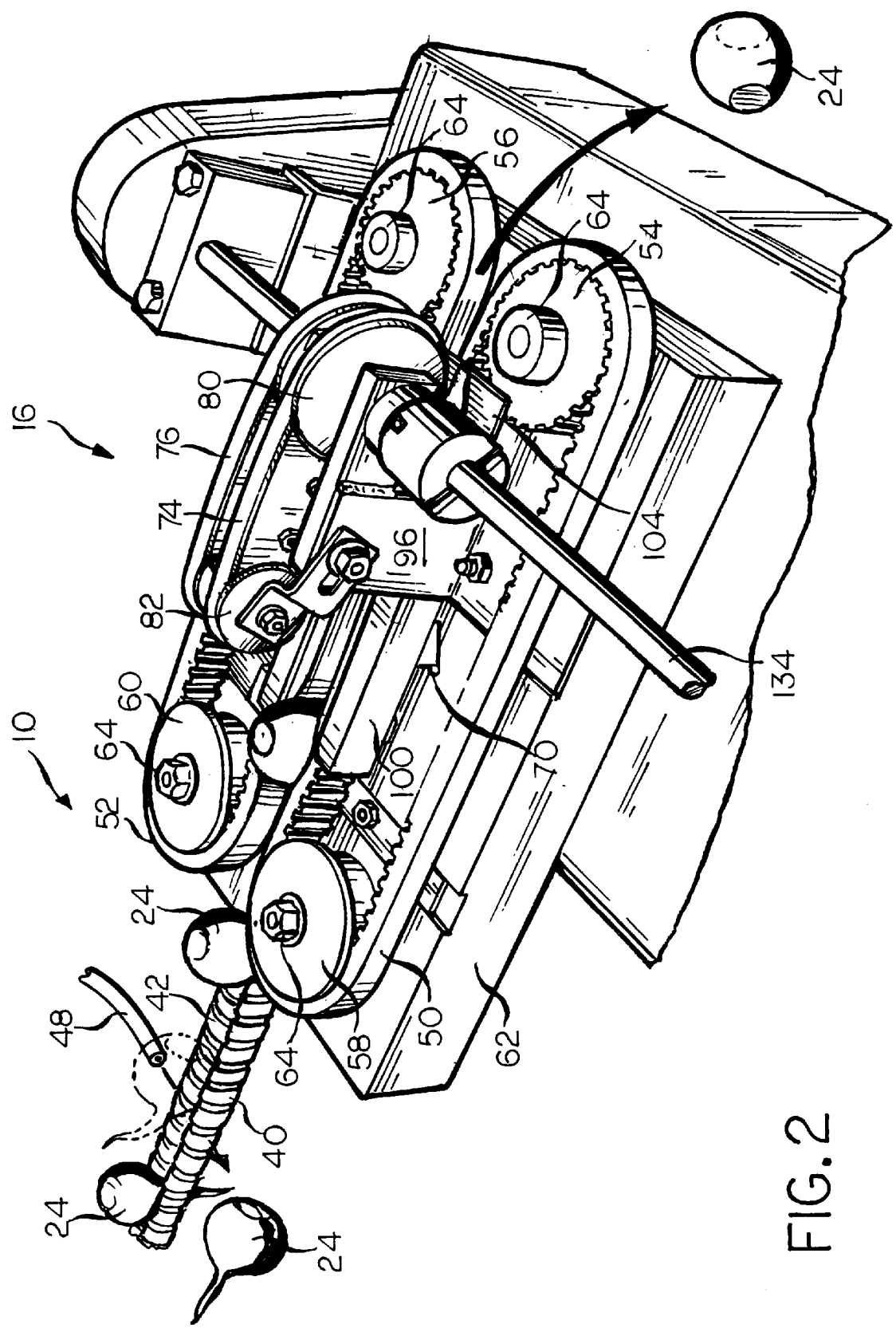
FIG. 2 is a side perspective view of the cutting mechanism according to the preferred embodiment of the invention.

After engaging the second cutting blade 104, the radish 24 continues to travel through the remainder of the cutting mechanism 16 and then is finally ejected from the cutting mechanism 16, as indicated by the arrow in FIG. 2. The prepared radish 24 may then be ejected onto a conveyor belt (not shown) for collection and packaging with other prepared radishes.

Figure 5:
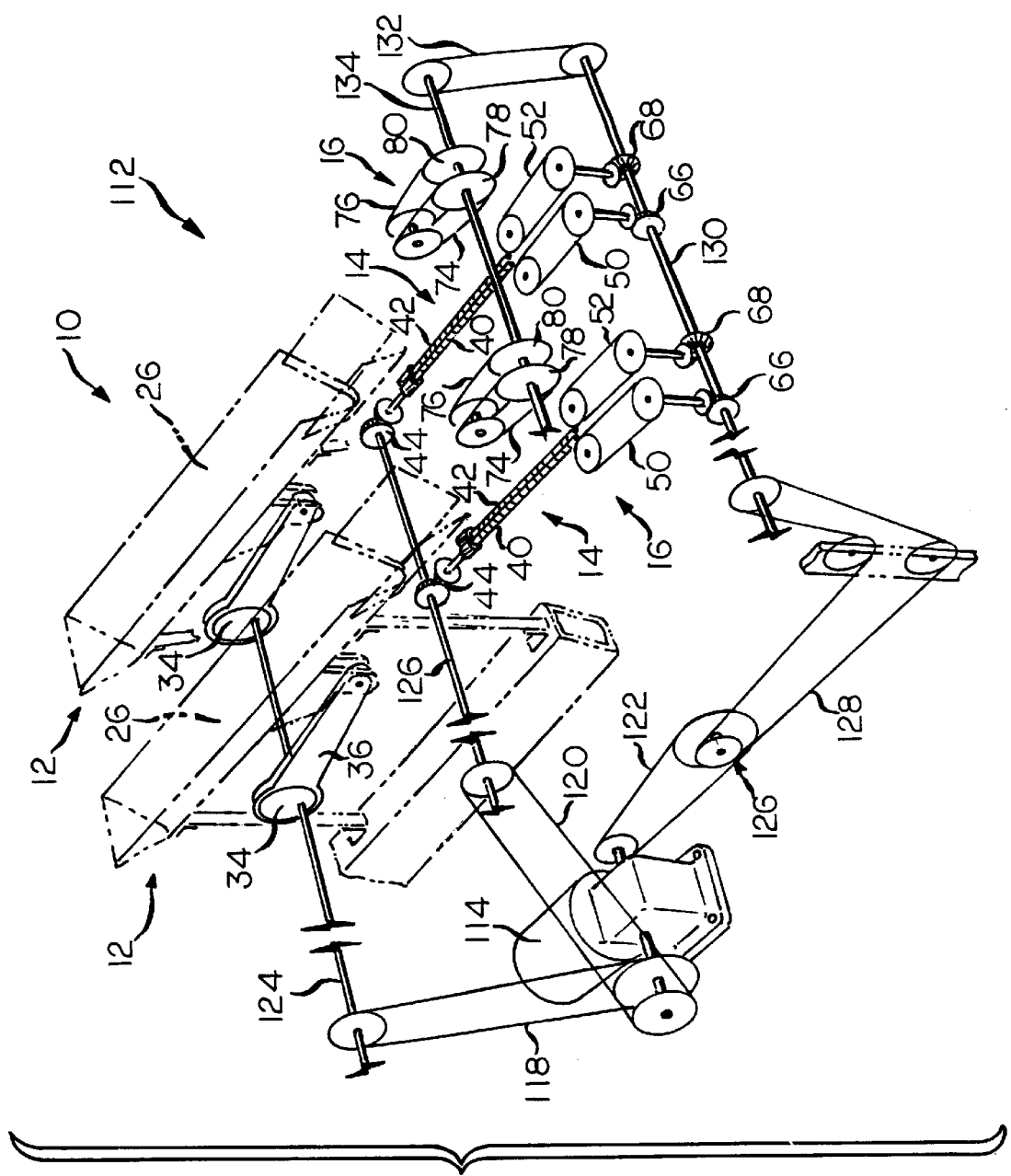
FIG. 5 is a schematic perspective view of the drive system of the preferred embodiment of the invention.

As mentioned earlier, the cam mechanism 34, the threaded rods 40, 42, the belts 50, 52 and the belts 74, 76 may be connected to a drive mechanism, shown generally at 112 in FIG. 5. The drive mechanism 112 provides for an efficient means of providing rotational energy to a plurality of feeding mechanism 12, transporting mechanisms 14 and cutting mechanism 16 of the apparatus 10. The drive mechanism includes a means for providing rotational energy to the above-mentioned mechanism, such as a motor 114. It should be noted that other forms of rotational energy producing devices may be used and that the invention is not limited by the motor 114. The motor 114 includes an output shaft 116 that is operatively coupled to a plurality of belts 118, 120, 122 or similar coupling devices, such as chains, and the like. The belt 118 is operatively coupled to a rod 124, which in turn, is operatively coupled to the cam mechanism 34 of the feeding mechanism 12. The rod 124 can be any desired length in order to accommodate any number of feeding mechanisms 12.

The belt 120 may be operatively coupled to a rod 126, which in turn, is operatively coupled to the worm gears 44 for driving the threaded rods 40, 42 of the transporting mechanism 14. Similar to the rod 124, the rod 126 can be any desired length in order to accommodate any number of transporting mechanisms 14.

The belt 122 may be operatively connected to an extension pulley 126 in order to effectively extend the length of the belt 122 to accommodate the desired length of the apparatus 10. An output belt 128 from the extension pulley 126 may, in turn, be operatively coupled to a rod 130, which in turn, is operatively coupled to the worm gears 66, 68 of the cutting mechanism 16. In addition, the rod 130 is operatively coupled to a belt 132, which in turn, is operatively coupled to a rod 134. The rod 134 is operatively coupled to the drive spools 78, 80 of the cutting mechanism 16.

As described above, the drive mechanism 112 of the apparatus 10 of the invention allows for a plurality of feeding mechanisms 12, transporting mechanisms 14, and cutting mechanisms 16 to be provided with rotational energy from a single motor 114 in an energy-efficient manner. Also, the drive mechanism 112 of the apparatus 10 can accommodate any number of feeding mechanisms 12, transporting mechanisms 14 and cutting mechanisms 16 in a cost-effective manner. In addition, the invention can be practiced by manually feeding the root vegetable to the cutting mechanism 16 without the need for the feeding and transporting mechanisms 12, 14 to allow an operator to manually feed the root vegetable to the cutting mechanism 16 at the proper orientation. Further, the apparatus 10 provides an energy-efficient and cost-effective apparatus and method of preparing a root vegetable, while reducing waste from the preparation of such a root vegetable.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An apparatus for processing vegetables comprising:

a transporting mechanism for transporting vegetables; and a cutting mechanism operatively connected to the transporting mechanism, and further including:

a first cutting blade for cutting one of a top section and a bottom section from the vegetable;

a plate for contacting the cut surface of the vegetable and orienting the vegetable with respect to the cut surface; and a second cutting blade for cutting the other of a top and a bottom section from the vegetable while the vegetable is oriented.

2. The apparatus of claim 1 including a pair of rotatably driven belts for frictionally engaging and positioning the vegetable with respect to the plate.

3. The apparatus of claim 2 including biasing means for biasing the plate toward the cut surface of the vegetable when the pair of belts engages the top section of the vegetable.

4. The apparatus of claim 3 including means for adjusting the amount of bias applied to the plate.

5. The apparatus of claim 2 including means for adjusting an angle at which the pair of belts frictionally engage the vegetable.

6. The apparatus of claim 1 wherein the transporting mechanism comprises a pair of spaced apart threaded rods.

7. The apparatus of claim 1 including a device for removing the vegetable from the transporting mechanism when the vegetable is not oriented properly on the transporting mechanism.

8. A method of processing vegetables comprising:

providing a vegetable;

orienting the vegetable;

cutting one of a top section and a bottom section from the vegetable to form a cut surface;

orienting the vegetable with respect to the cut surface by contacting the cut surface with a plate; and cutting the other of the top section and the bottom section of the oriented vegetable.

9. The method of claim 8 in which the step of orienting the vegetable with respect to the cut surface includes frictionally engaging and positioning the vegetable with respect to the plate with a pair of rotatably driven belts.

10. The method of claim 9 including biasing the plate toward the cut surface of the vegetable when the pair of belts engages the vegetable.

11. The method of claim 9 including adjusting an angle at which the pair of belts frictionally engage the vegetable.

12. A method of processing vegetables comprising:

providing a vegetable;

orienting the vegetable with respect to a transport mechanism;

cutting one of a top section and a bottom section from the vegetable to form a cut surface;

orienting the vegetable with respect to the cut surface by contacting the cut surface with a plate; and cutting the other of the top section and the bottom section of the oriented vegetable.

13. The method of claim 12 in which the step of orienting the vegetable with respect to the cut surface includes frictionally engaging and positioning the vegetable with respect to the plate with a pair of rotatably driven belts.

14. The method of claim 13 including biasing the plate toward the cut surface of the vegetable when the pair of belts engages the vegetable.

15. The method of claim 14 including adjusting an angle at which the pair of belts frictionally engage the vegetable.

16. The method of claim 12 in which the step of cutting one of a top section and a bottom section includes cutting a root portion of the vegetable with a first knife, and the step of cutting the other section includes cutting a stem portion of the vegetable with a second knife.

17. The method of claim 12 including transporting the vegetable with the transport mechanism during the first cutting step, wherein the transport mechanism comprises a pair of spaced apart threaded rods.

18. The method of claim 17 including removing the vegetable from the transport mechanism when the vegetable is not oriented properly with respect to the transport mechanism.

19. The method of claim 18 wherein the vegetable is oriented properly when a root portion of the vegetable is disposed between the pair of threaded rods.

* * * * *